United States Patent
Cohen et al.

(10) Patent No.: US 6,736,991 B1
(45) Date of Patent: May 18, 2004

(54) REFRIGERATION LUBRICANT FOR HYDROFLUOROCARBON REFRIGERANTS

(75) Inventors: Stephen C. Cohen, Chestnut Ridge, NY (US); Michael Costello, Southington, CT (US)

(73) Assignee: Crompton Corporation, Middlebury, CT (US)

( * ) Notice: Subject to any disclaimer, the term of this patent is extended or adjusted under 35 U.S.C. 154(b) by 0 days.

(21) Appl. No.: 10/365,750

(22) Filed: Feb. 12, 2003

(51) Int. Cl.$^7$ .................. C10M 105/18; C09K 5/04
(52) U.S. Cl. ........................................... 252/68
(58) Field of Search ........................... 252/68

(56) References Cited

U.S. PATENT DOCUMENTS

| | | | | |
|---|---|---|---|---|
| 5,152,926 A | * | 10/1992 | Brown | 252/32.5 |
| 5,298,178 A | * | 3/1994 | O'Neill et al. | 252/49.3 |
| 5,792,383 A | | 8/1998 | Reyes-Gavilan et al. | 252/68 |
| 6,193,906 B1 | | 2/2001 | Kaneko et al. | 252/68 |
| 6,475,405 B1 | | 11/2002 | Kawaguchi et al. | 252/68 |

FOREIGN PATENT DOCUMENTS

EP         0908509 A1    4/1999

OTHER PUBLICATIONS

Yamamoto et al., Solubility of HfC134a in Lubricants and its Influence on Tribological Performance, Tribology Transactions, vol. 44, pp. 209–214, (2001).

Sundaresan et al., A Comparison of the Effects of Poe and Mineral Oil Lubricants on the In–Tube Evaporation of R–22, R–407C and R–410A, Proc. Int. Refrig. Conf. Purdue, 6$^{th}$, pp. 187–192, (1996).

Gopalnarayanan et al., Performance of R–407C with Miscible and Immiscible Lubricants in Unitary Systems, 8$^{th}$ International Refr. Conf. Purdue, pp. 233–240, (2000).

Sundaresan et al., A Comparison of the Oil Return Characteristics of R–22/Mineral Oil and its HFC Alternatives (R–407C & R–410A) with Mineral Oil and POE Residential Heat Pump, Proc. Int. Refrig. Conf. Purdue. 6$^{th}$ , pp. 297–302, (1996).

* cited by examiner

Primary Examiner—John R Hardee
(74) Attorney, Agent, or Firm—Daniel Reitenbach

(57) ABSTRACT

A fluid refrigeration composition is disclosed that comprises a naphthenic mineral oil lubricant, a hydrofluorocarbon refrigerant that is immiscible with the naphthenic mineral oil lubricant, and an effective amount of at least one nonionic surfactant; wherein said surfactant has a Hydrophilic-Lipophilic Balance in the range of from about 9.8 to about 11.8, is completely soluble in the naphthenic mineral oil lubricant, and has a low pour point; and wherein the blend of surfactant and lubricant is completely clear and transparent and has a low pour point.

14 Claims, No Drawings

REFRIGERATION LUBRICANT FOR HYDROFLUOROCARBON REFRIGERANTS

BACKGROUND OF THE INVENTION

1. Field of the Invention

The present invention relates to fluid refrigeration compositions comprising a hydrocarbon lubricant, a refrigerant immiscible with the hydrocarbon lubricant, and an additive capable of reducing the interfacial tension between the hydrocarbon lubricant and the immiscible refrigerant. More particularly this invention comprises a fluid refrigeration composition comprising a naphthenic mineral oil lubricant, a hydrofluorocarbon refrigerant immiscible with the napthenic mineral oil lubricant, and a surfactant capable of reducing the interfacial tension between the napthenic mineral oil lubricant and the hydrofluorocarbon refrigerant.

2. Description of Related Art

The implementation of the Montreal Protocol to reduce the production of ozone-depleting CFC's (Chlorinated Fluorocarbons) has led the refrigeration and air-conditioning industry to use HFC's (Hydrogenated Fluorocarbons, or "Hydrofluorocarbon") as alternative refrigerants to the fully halogenated chlorofluorocarbons, such as R12, or the hydrochlorofluorocarbons, such as R-22 (hydrochlorodifluoromethane). Historically, the refrigeration lubricants of choice for CFC's, e.g., R12 and R22, were purified naphthenic base oils because they were completely miscible in these refrigerants and had good low temperature properties. The traditional view was that the refrigerant and lubricant must be miscible to facilitate lubricant return to the sump of the compressor. The belief is that, immiscibility or poor dispersability between the refrigerant and lubricant at unit operating temperatures may provide unsuitable oil return to the compressor This causes improper heat transfer due to oil coating of the inner surface of the heat exchange coils, and in extreme cases, lubricant starvation of the compressor. The former causes energy efficiency losses, and the latter results in unit burn-out.

The naphthenic mineral oil lubricants that have been used widely in the past are not miscible with the new HFC's such as, R-134a (1,1,1,2-tetrafluoroethane), R-152a (1,1-difluoroethane), R-32 (difluoromethane), R-143a (1,1,1-trifluorethane), R-125 (1,1,1,2,2-pentafluoroethane), and azeotropic and zeotropic blends consisting of any one of these, or other, HFC components, for example, R 407C, which is a blend of R-32, R-134a and R-125, and R 410A, which is a blend of R32 and R125. This has led to the development of synthetic refrigeration lubricants, such as polyalkylene glycols for use with R134a in automotive air conditioning, or specific short chain polyol esters and polyvinyl ethers for use with R407C and R410A. See, for example, Yamamoto et al., *Tribology Transactions*, 44-2:209–21 (2001); Sundaresan et al., *Proc. Int. Refrig. Conf. Of Purdue U. 6th Annual* (1996) pp. 187–192; and Gopalnarayanan et al., *Proc. Int. Refrig. Conf. Of Purdue U.8th Annual* (2000) pp. 233–240.

U.S. Pat. No. 5,792,383 discloses fluid refrigeration compositions comprising a hydrocarbon lubricant, an immiscible refrigerant and an additive capable of reducing the interfacial tension between the hydrocarbon lubricant and refrigerant.

U.S. Pat. No. 6,074,573 (see also EP 0 908 509 A1) discloses a refrigerator oil composition comprising at least one base oil selected from mineral oils and synthetic oils, and at least one polyoxyethylene-type nonionic surfactant. The composition is said to have an excellent lubricating property, while specifically improving the lubricity between aluminum materials and steel materials. This is said to be effective for preventing such materials from being seized and worn, and suitable as a lubricating oil in refrigerators using hydrogen-containing HFC refrigerants, such as R134a, that do not cause environmental pollution.

U.S. Pat. No. 6,193,906 discloses a refrigerating oil composition which is said to exhibit excellent lubrication properties when used in combination with certain types of coolant, such as a hydrofluorocarbon coolant, which may serve as substitutes for chlorofluorocarbon coolants which have been implicated as causing environmental problems. The refrigerating oil composition is obtained by incorporating, into a component (A); i.e., a base oil containing a synthetic oil, a component (B); i.e, a polyalkylene glycol derivative of formula (I) having a number average molecular weight of 200–3,000: $R^1-(OR^2)_m-(OR^3)_n-OR^4$(I) wherein $R^1$ and $R^4$ represent $C_1-C_{30}$ hydrocarbon groups, etc.; $R^2$ represents a $C_2-C_4$ alkylene group; $R^3$ represents a $C_2-C_{30}$ alkylene group; m and n are numbers that satisfy the above-described molecular weight conditions, wherein n may be 0; and at least one of $R^1$, $R^3$, and $R^4$ has a hydrocarbon group having six or more carbon atoms.

U.S. Pat. No. 6,475,405 discloses a lubricating oil for compression-type refrigerator comprising, as a main component, a polyoxyalkyleneglycol derivative represented by the general formula: $R^1[(OR^2)_m OR^3]_n$ wherein symbols are as defined in the specification. The lubricating oil is said to have a favorable compatibility with refrigerants and an excellent lubricating property, and is utilized as the lubricating oil for compression-type refrigerator employing hydrogencontaining fluorocarbon compound refrigerants including R-134a or fluorocarbon compound refrigerants without hydrogen.

The disclosures of the foregoing are incorporated herein by reference in their entirety.

SUMMARY OF THE INVENTION

A general object of this invention is to provide refrigeration fluid compositions comprising a naphthenic mineral oil lubricant and a hydrofluorocarbon refrigerant immiscible with the lubricant. Other objects appear hereinafter.

It has now been found that the objects of this invention can be obtained with refrigeration fluid compositions comprising a naphthenic mineral oil lubricant and a hydrofluorocarbon refrigerant immiscible with the lubricant, and an effective amount of a specific class of nonionic surfactants.

For purposes of this invention, the term "immiscible" means that a two-phase system is formed between refrigerant and lubricant, at least at any point in the typical operating range of −40° C. to 80° C. in refrigeration or air conditioning systems.

More particularly, the present invention is directed to a fluid refrigeration composition comprising a naphthenic mineral oil lubricant, a hydrofluorocarbon refrigerant that is immiscible with the naphthenic mineral oil lubricant, and an effective amount of at least one nonionic surfactant wherein said surfactant has a Hydrophilic-Lipophilic Balance in the range of from about 9.8 to about 11.8, is completely soluble in the naphthenic mineral oil lubricant, and has a low pour point; and wherein the blend of surfactant and lubricant is completely clear and transparent and has a low pour point.

DESCRIPTION OF THE PREFERRED EMBODIMENTS

The purified naphthenic mineral oils historically used in refrigeration are made by contacting naphthenic mineral oils with sulfuric acid and filtering with either clay or bauxite to reduce sulfur- and nitrogen-containing heterocyclic compounds and improve low temperature properties by reducing small amounts of residual wax.

These naphthenic base oils have been widely used because they have good, low temperature properties due to a naturally, low concentration of waxy, paraffinic hydrocarbons. The refrigeration lubricants employed in the practice of the present invention are characterized by low Pour Points (ASTM D97) and low Aniline points (ASTM D611). In addition, the sulfur and nitrogen compounds have been reduced such that the total sulfur and nitrogen is at low levels (0.05% or lower). They come in a range of viscosities from 13–100 cSt at 40° C. (60–500 SUV at 100° F.). Typical properties of the most widely used of these, Suniso® 3GS and Suniso 4GS are shown in Table 1.

TABLE 1

Properties of Two Typical Naphthenic Mineral Oil Refrigeration Lubricants

| | | Suniso ® 3GS | Suniso ® 4GS |
|---|---|---|---|
| Viscosity at 40° C. | ASTM D445 | 28–32 | 53–57 |
| Viscosity Index | ASTM D2270 | 10 | 20 |
| Specific Gravity at 15° C. | ASTM D4052 | 0.910 | 0.915 |
| Pour Point | ASTM D97 | −40° C. max | −35° C. max |
| Floc Point (in R22) | ASHRAE 86H | −50° C. max | −45° C. max |
| Water, ppm | ASTM D1533 | 25 ppm | 30 ppm |
| Sulfur | ASTM D3120 | 200 ppm | 300 ppm |
| Total Acid Number | ASTM D974 | 0.01 | 0.02 |
| Composition $C_A/C_N/C_P$ | ASTM 32328 | 14/44/42 | 12/45/43 |
| Aniline Point | ASTM D611 | 70° C. | 79° C. |

$C_A/C_N/C_P$ is the ratio of aromatic to naphthenic to paraffinic compounds. The naphthenic compounds are cyclo-paraffinic in structure.

In some instances, it may be beneficial to employ a mixture of a major portion of a naphthenic mineral oil, e.g., about 80–99% by weight, with a minor amount of an alkylbenzene, e.g., about 1–20% by weight.

It has now been found that certain non-ionic surfactants having a relatively narrow range of Hydrophilic-Lipophilic Balance (HLB) from 9.8–11.8 can, when blended with the naphthenic base oils used historically in refrigeration for R12 and R22, form a refrigeration lubricant that is crystal clear (does not separate on storage) and shows good "returnability" to the compressor in refrigerator tests. HLB values are provided by manufacturers and can also be found in McCutcheon's *Emulsifiers and Detergents*, North America (2002).

Surfactants have been tried before for this purpose. In U.S. Pat. No. 5,792,283, the se of surfactants, such as 2,4,7,9-tetramethyl-5-decyne-4-7 diol (Surfynol SE) or fluorocarbon alkyl esters, e.g., Fluorad FC 430 is disclosed. The Surfynol SE has an HLB value of 4–5. It forms a clear solution with naphthenic mineral oils at a level of 0.05%, but begins to separate from the oil at all concentrations above 0.1%. Fluorad FC430, which has a high HLB in excess of 18, behaves similarly.

In general, the chemical composition of the nonionic surfactants of the present invention belong to chemical families such as ethoxylated sorbitan derivatives (ethoxylated sorbitan fatty acid esters); ethoxylated alcohols, ethoxylated alkyl aryl phenols, ethoxylated fatty acids, and ethoxylated fatty esters and oils (animal or vegetable).

Preferably, the surfactant is employed at a concentration of from about 5 to about 30 parts by weight per 100 parts by weight naphthenic mineral oil lubricant. More preferably, the concentration will be in the range of from about 10 to about 25; most preferably, from about 15 to about 20.

All surfactants with an HLB of 9.8–11.8 form crystal clear transparent solutions with the naphthenic mineral oils (See Table 2); however, not all the non-ionic surfactants falling within this HLB range are suitable. In addition, the blend must have good low temperature properties, i.e., a low pour point. Otherwise, the lubricant, which forms an emulsion with the HFC refrigerants, will separate and even solidify at the condenser, which is the low temperature point in the refrigeration cycle.

TABLE 2

| NON-IONIC SURFACTANT | | | | 20% Surfactant in Naphthenic Refrigerant Base Oil | |
|---|---|---|---|---|---|
| Chemical Family Name | Trade Name | HBL Value | Pour Point ° C. | Appearance | Pour Point ° C. |
| 2,4,7,9 Tetramethyl-5-decyne 4,7 Diol | Surfynol SE | 4–5 | −33 | Hazy | Separates |
| PEG 200 Monolaurate | Lumulse 20L | 9.3 | — | Hazy-Opaque | — |
| Ethoxylated Sorbitan Ester, Polysorbate 61 | Liposorb S-4 | 9.6 | — | Hazy-Opaque | — |
| Ethoxylated Octyl Phenol | Triton X-45 | 9.8 | −27 | Clear | −45 |
| Linear alcohol Ethoxylate | Surfonic L24-4-4 | 9.9 | 3 | Clear | −3 |
| Ethoxylated Propoxylated linear alcohol | Surfonic P-5 | 10.0 | −24 | Clear | −26 |
| Polysorbate 81, POE (5) Sorbitan Mono Oleate | Lumisorb PSMO-5 | 10.0 | −30 | Clear | −48 |
| PEG 400 Di-Laurate | Lipopeg 4DL | 10.0 | 12 | Clear | 3 |
| | Lumulse 42-L | 10.8 | — | Clear | 1.8 |
| Polysorbate 60, POE (20) Sorbitan Tri-Stearate | Liposorb TS-20 | 10.5 | 33 | Clear | 18 |
| Polysorbate 85, POE (20) Sorbitan Tri-Tallate or Tri-Oleate | Liposorb TO-20 | 11.0 | −27 | Clear | −48 |
| | Lumisorb PSTT-20 | 11.0 | −36 | Clear | −48 |
| | Lonzest STO-20 | 11.0 | −36 | Clear | −45 |

TABLE 2-continued

| | NON-IONIC SURFACTANT | | | 20% Surfactant in Naphthenic Refrigerant Base Oil | |
|---|---|---|---|---|---|
| Chemical Family Name | Trade Name | HBL Value | Pour Point ° C. | Appearance | Pour Point ° C. |
| PEG 400 Mono-Sterate | Lipopeg 4S | 11.2 | 23 | Cear | 30 |
| PEG 400 Di-Oleate | Lumulse 42OT | 11.8 | −9 | Clear | −27 |
| PEG 400 Mono-Oleate | Lumulse 40-0-MSC | 11.8 | — | Hazy | — |
| PEG 400 Mono-Laurate | Lumulse 40 | 12.8 | — | Hazy | 12 |
| POE (20) Sorbitan Mono-Oleate | Liposorb PSM0-20 | 15.0 | — | Hazy | — |

The data in Table 2 show clearly that those nonionic surfactants having HLB values between 9.8 and 11.8 are compatible with the refrigeration base stocks and form clear, transparent solutions. However, some of these surfactants, chiefly those that are based on saturated alcohols, or saturated fatty acids, such as lauric or stearic acid, have high pour points and will solidify at temperatures below −20° C. and, thus, are not suitable for use in the practice of the present invention. For this reason, surfactants that employ unsaturated fatty acids, such as oleates or tallates, or branched alcohols or acids are preferred.

Refrigeration lubricants must have "good" return to the compressor sump. If the lubricant tends to separate elsewhere in the system, then the proportion of refrigerant to lubricant will rise in the sump of the compressor until eventually the concentration of the lubricant is sufficiently low that accelerated wear of the compressor begins to occur. This is especially a concern with two phase or emulsifiable refrigerant systems, which form from these oil/surfactant blends with the HFC refrigerant.

Lubricant return is measured in a refrigeration compressor system by charging a fixed weight of a test lubricant to the compressor along with the refrigerant (in the present case, an HFC, Freon R134a, was used) and running the refrigerator. The compressor is then shut down and the lubricant is recovered from the sump of the compressor and measured. Results of this test are shown in Table 3 where the return is measured after three days and show the beneficial results obtained by use of the surfactants of the present invention, as opposed to those obtained with no surfactant or with the Sulfynol SE known in the art. Specifically, naphthenic mineral oil is not miscible with Freon R134a and, after 3 days, the return is 70–75%, whereas surfactants that are completely soluble in the naphthenic mineral oil, e.g., POE (5), sorbitan monooleate, or POE (20), sorbitan trioleate, return 85–90% to the compressor sump.

TABLE 3

Return Test for Refrigeration Lubricant

| Lubricant/Surfactant | % Surfactant | HLB Value | % Return[1] |
|---|---|---|---|
| Naphthenic Oil None | NIL | — | 74.6 |
| Naphthenic Oil/Lonzest STO-20 | 18 | 11.0 | 91.3 |
| Naphthenic Oil/Lumisorb PSMO-5 | 18 | 10.0 | 84.1 |
| Naphthenic Oil/Liposorb TO-20 | 18 | 11.8 | 85.2 |
| Naphthenic Oil/Liposorb TO-20 | 10 | 11.0 | 79.0 |
| Naphthenic Oil/Lumulse 42-TO | 18 | 11.8 | 85.2 |
| Naphthenic Oil/Surfynol SE | 0.5 | 4–5 | 75.8 |

TABLE 3-continued

Return Test for Refrigeration Lubricant

| Lubricant/Surfactant | % Surfactant | HLB Value | % Return[1] |
|---|---|---|---|

[1]Percent return to the compressor sump after 72 hours.
All lubricants were blended to meet a viscosity specification 28–30 cSt at 40° C., (150–160 SUV at 100° F.).
The tests were performed in top-mount refrigerators with Americold Compressor (Model #RG-107-1).

In addition to the property of good return to the compressor sump, the lubricant must, of course, provide satisfactory lubrication, reducing wear of sliding compressor parts, e.g., piston, valves, and the like, not causing corrosion of metals used in the construction of the compressor, which can lead to corrosive wear and pitting and eventual failure, nor leading to build up of deposits that can interfere with lubrication and seals, nor degradation of the HFC refrigerant. A standard test used by the industry for evaluation of thermal stability is the Sealed Tube Stability Test (originally ASHRAE 97–83, now 97–99). In this test, refrigerant and lubricant are sealed into an evacuated glass tube containing samples of selected metals—usually copper, steel, and aluminum alloys—immersed in the liquid. The tube is then maintained at 175° C. for 14 days, cooled, and the contents removed for analysis. The refrigerant is analyzed by gas chromatography for degradation; the lubricating oil is analyzed for changes in acid number and the presence of metals; and the metal samples are evaluated for corrosion. This accelerated test simulates the interaction between the lubricant and the refrigerant in the presence of the mixed metals of construction. A good refrigeration lubricant will not cause degradation of the refrigerant or corrosion of the metals.

Suitable refrigerants useful in the practice of this invention include those which contain at least one carbon atom and one fluorine atom. Examples of suitable refrigerants include R-134a (1,1,1,2-tetrafluoroethane), R-143a (1,1,1-trifluoroethane), R-152a(1,1-difluoroethane), R-32 (difluoromethane), R-125 (1,1,1,2,2-pentafluoroethane), and the like, and mixtures thereof. These mixtures can also contain propane as component of the blend in those applications where the heat exchange fluid is going to be used as an interim retrofit fluid for existing refrigeration and air conditioning equipment. If desired, the suitable refrigerants can be used with CFC refrigerants, particularly, where residual amounts of these refrigerants are present in a system being retrofitted.

The weight ratio of naphthenic mineral oil to immiscible refrigerant can range from 0.10 to 15 parts by weight per 100 parts by weight refrigerant as is conventional in this art.

Those skilled in the art will realize that additives that prevent corrosion and provide anti-wear may also be added to the basic composition. Preferred anti-wear compounds for refrigeration are the alkyl-aryl or tri-aryl phosphates because of their good thermal stability. Similarly, suitable corrosion inhibitors are the tolyltriazole derivatives for copper and the alkenyl succinic acid half esters for steel. In general, the more aggressive, extreme pressure additives based on chlorine or sulfur compounds, or acid phosphate esters are not suitable because they are too labile and thermal stability is insufficient.

In view of the many changes and modifications that can be made without departing from principles underlying the invention, reference should be made to the appended claims for an understanding of the scope of the protection to be afforded the invention.

What is claimed is:

1. A fluid refrigeration composition comprising a naphthenic mineral oil lubricant, a hydrofluorocarbon refrigerant that is immiscible with the naphthenic mineral oil lubricant, and an effective amount of at least one nonionic surfactant wherein said surfactant has a Hydrophilic-Lipophilic Balance in the range of from about 9.8 to about 11.8, is completely soluble in the naphthenic mineral oil lubricant; and wherein the blend of surfactant and lubricant is completely clear and transparent.

2. The composition of claim 1 wherein the surfactant is present in a concentration of 5 to 30 parts by weight per 100 parts by weight of the naphthenic mineral oil lubricant.

3. The composition of claim 1 wherein the naphthenic mineral oil lubricant has sulfur and nitrogen levels of no more than 0.05%, and a viscosity in the range of from about 13 to about 100 cSt at 40° C.

4. The composition of claim 1 further comprising an alkylbenzene oil lubricant.

5. The composition of claim 1 wherein the surfactant is selected from the group consisting of ethoxylated sorbitan derivatives, ethoxylated alcohols, ethoxylated alkyl aryl phenols, ethoxylated fatty acids, and ethoxylated fatty esters and oils.

6. The composition of claim 5 wherein the surfactant comprises a moiety selected from the group consisting of unsaturated fatty acids, branched alcohols, and branched acids.

7. The composition of claim 6 wherein the moiety is an unsaturated fatty acid selected from the group consisting of oleates and tallates.

8. The composition of claim 1 wherein the surfactant has a pour point no higher than −20° C.

9. The composition of claim 1 wherein the blend of surfactant and lubricant has a pour point no higher than −20° C.

10. The composition of claim 1, wherein the refrigerant is selected from the group consisting of 1,1,1,2-tetrafluoroethane; 1,1,1-trifluoroethane; 1,1-difluoroethane; difluoromethane; 1,1,1,2,2-pentafluoroethane; and mixtures thereof.

11. The composition of claim 1 wherein the refrigerant is immiscible over the whole temperature range of −40° C. to 80° C.

12. The composition of claim 1 further comprising additives selected from the group consisting of anti-corrosion additives and anti-wear additives.

13. The composition of claim 12 wherein the anti-corrosion additive is a tolyltriazole derivative or an alkenyl succinic acid half esters.

14. The composition of claim 12 wherein the anti-wear additive is an alkyl-aryl or tri-aryl phosphate.

* * * * *